(12) United States Patent
Haid

(10) Patent No.: US 8,188,860 B2
(45) Date of Patent: May 29, 2012

(54) SECURE SENSOR/ACTUATOR SYSTEMS

(75) Inventor: Josef Haid, Graz (AT)

(73) Assignee: Infineon Technologies AG, Neubiberg (DE)

( * ) Notice: Subject to any disclaimer, the term of this patent is extended or adjusted under 35 U.S.C. 154(b) by 1141 days.

(21) Appl. No.: 11/876,218

(22) Filed: Oct. 22, 2007

(65) Prior Publication Data

US 2009/0102643 A1    Apr. 23, 2009

(51) Int. Cl.
*G08B 21/00* (2006.01)
(52) U.S. Cl. ............... 340/540; 340/3.7; 726/26
(58) Field of Classification Search .......... 340/5.2, 340/5.3, 5.8, 3.1, 3.7, 12.3, 12.4, 12.5, 12.54, 340/572.1, 572.4, 540; 714/48; 726/26, 726/27
See application file for complete search history.

(56) References Cited

U.S. PATENT DOCUMENTS

| | | | | |
|---|---|---|---|---|
| 5,963,928 | A * | 10/1999 | Lee | 705/401 |
| 6,496,119 | B1 * | 12/2002 | Otterstedt et al. | 340/653 |
| 2003/0218475 | A1 | 11/2003 | Gammel | |

FOREIGN PATENT DOCUMENTS

| | | |
|---|---|---|
| DE | 100 44 837 C1 | 9/2001 |
| WO | WO-2006/043185 A1 | 4/2006 |

* cited by examiner

*Primary Examiner* — Thomas Mullen
(74) *Attorney, Agent, or Firm* — Dickstein Shapiro LLP

(57) ABSTRACT

A chip module including a sensor/actuator, an input/output interface, a data processing circuit connected between the input/output interface and the sensor/actuator such that sensor/actuator data may be communicated to/from outside the chip module via the input/output interface, and a manipulation detector assembly configured to output an alarm signal responsive to attacks affecting the sensor/actuator data.

25 Claims, 9 Drawing Sheets

SECURE SENSOR/ACTUATOR SYSTEMS

The present invention relates to sensor/actuator chip modules, in particular to sensor/actuator chip modules resistant to or at least protected against error-provoking attacks, as may, for example, be used for automated control.

An increasing number of sensors and actuators are employed to automate controllers in, for example, airplanes, cars or buildings. Exemplarily, speeds in cars can be controlled by distance measuring or airplane steering can be automated. In particular in applications of this kind, authenticity, integrity and privacy of data from sensors and/or to actuators are required to ensure the security of the entire automation.

SUMMARY OF THE INVENTION

According to embodiments, the present invention provides a chip module including a sensor, an input/output interface, a data processing circuit connected between the input/output interface and the sensor so that sensor data which are dependent on a sensor output signal of the sensor may be communicated to outside the chip module via the input/output interface, and a manipulation detector assembly configured to output an alarm signal responsive to attacks affecting the sensor data.

Further embodiments of the present invention provide a chip module comprising an actuator, an input/output interface, a data processing circuit connected between the input/output interface and the actuator so that actuator data which actuator actions of the actuator are dependent on may be received from the outside via the input/output interface, and a manipulation detector assembly configured to output an alarm signal responsive to attacks affecting the actuator actions.

BRIEF DESCRIPTION OF THE FIGURES

Preferred embodiments of the present invention will be detailed subsequently referring to the appended drawings, in which.

DETAILED DESCRIPTION OF THE INVENTION

Figure 1:
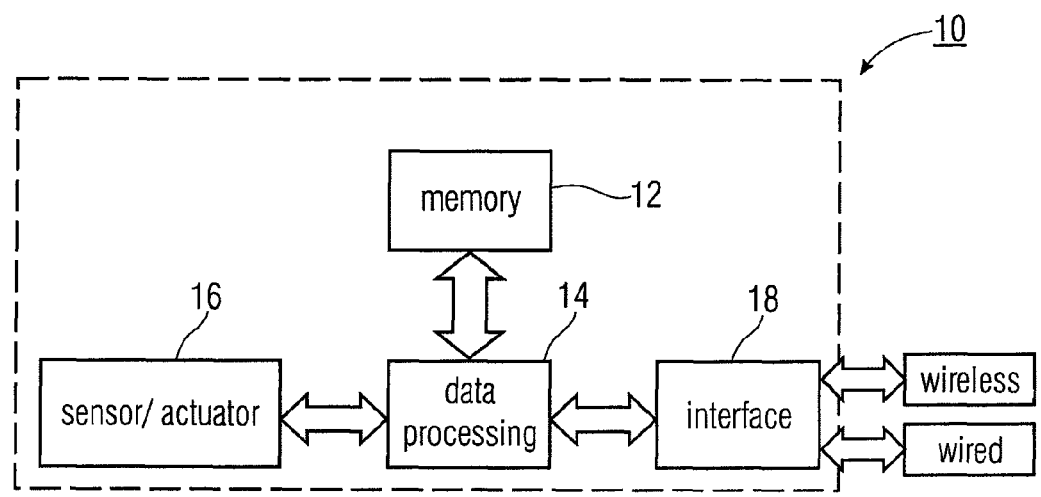
FIG. 1 shows a schematic block circuit diagram of a conventional sensor/actuator chip module.

With reference to the following description, it should be kept in mind that same functional elements or functional elements having the same effect in various embodiments comprise same reference numerals and thus descriptions of these functional elements in the various embodiments described below are mutually interchangeable.

FIG. 1 shows a schematic structure of a sensor or actuator chip module 10.

The chip module 10 comprises a memory 12 connected to a data processing block or data processing circuit 14. In addition, the chip module 10 includes a sensor or actuator element 16 and an input/output interface 18. The data processing circuit 14 can receive, process and pass on to the input/output interface 18 data from the element 16 or transmit data which it has received and processed from the input/output interface 18 to the element 16, depending on whether the element 16 is a sensor element or an actuator element. The input/output interface 18 is provided to transmit data from the data processing circuit 14 to the outside, i.e. outside the chip module 10, and/or receive data from the outside and pass the data on to the data processing circuit 14.

Sensor/actuator systems can be used to automate controllers. Controllers are also increasingly used for critical applications, like for example controls of cars, airplanes or robots. In addition, controllers are to an increasing extent no longer used in an autonomously, but in a networked manner (like, for example, automatic airplane steering by means of earth-based remote control). Guaranteeing integrity, authenticity and privacy of the data and control processes of the sensor/actuator systems is of high importance here in order to recognize manipulations and be able to react appropriately.

If a manipulation of the data on a sensor/actuator chip module, as is exemplarily shown in FIG. 1, cannot be ruled out completely, the following scenario will be conceivable:

a hacker enters a data line of an airplane and hijacks it;

a distance measuring device is manipulated and a car collides with a car driving in front;

a robot performs inappropriate actions caused by false sensor information.

When data are transferred in an encrypted manner between individual network elements of a controller network, such as, for example, sensor and/or actuator chip modules on the one hand and a central processor on the other hand, this is not sufficient protection against manipulation of the data to be transferred. When data from sensors and/or to actuators are manipulated directly on the respective chip modules, as is, for example, possible by fault-provoking or fault attacks, the manipulated data may be transferred from and/or to the chip modules in an encrypted manner.

In order to guarantee the transfer of non-manipulated data or reduce the effect of the transfer of data already manipulated, in the following embodiments the sensor and/or actuator chip modules comprise protective measures against manipulation of the data coming from the sensor elements and/or provided for the actuator elements, directly on the chip modules.

Usually, an attacker will try to attack data in the chip module, such as, for example, digitalized data. A local change in the ambient conditions to be detected by a sensor, like for example temperature, is conceivable, however, this will usually be more difficult for an attacker to perform. This context is schematically shown in FIG. 2.

Figure 2:
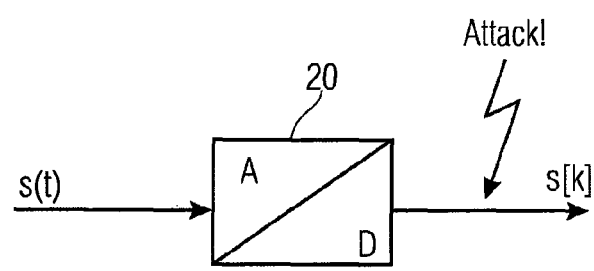
FIG. 2 is a schematic illustration of an attack to digital data.

FIG. 2 exemplarily shows an analog signal s(t) which may, for example, come from a sensor element of a chip module. The analog signal s(t) is fed to an analog-to-digital converter 20 quantizing and digitalizing it to form a discrete-time signal s[k]. This discrete-time signal s[k] can be attacked and/or manipulated in different ways.

Exemplarily, errors are induced in a chip module by influences from outside so that chip module-internal results will be corrupted. In sensor and/or actuator chip modules, there is the particular danger of inducing errors from outside which corrupt and/or manipulate the sensor data and/or actuator data and thus cause undesired or even dangerous effects in an automated controller. Exemplarily, the digitalized and maybe calibrated sensor signal will be altered by manipulation such that it will indicate a false measuring value. Inversely, an actuator signal subjected to a digital-to-analog conversion may be altered relative to a desired value as is indicated by a digital actuator input signal.

Figure 3:
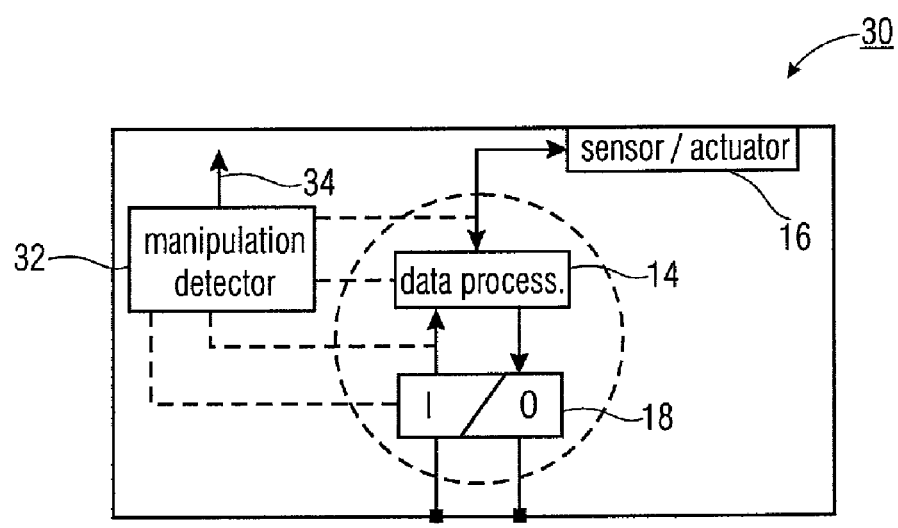
FIG. 3 shows a schematic block circuit diagram of a sensor chip module according to an embodiment of the present invention.

FIG. 3 schematically shows a chip module 30 according to an embodiment which may be a sensor chip module or an actuator chip module which is able to recognize attacks to sensor and/or actuator data.

The chip module 30 comprises a sensor element and/or an actuator element, depending on whether it is a sensor or an actuator chip module. The chip module 30 includes an input/output interface 18 to communicate with the outside. Furthermore, the chip module 30 includes a data processing circuit 14 connected between the input/output interface 18 and the sensor and/or actuator 16. In the case of a sensor, the data processing circuit 14 is connected between the input/output interface and the sensor 16 such that, for example, digital sensor data which depend on an exemplarily analog sensor output signal of the sensor 16 may be communicated to the outside via the input/output interface 18. In the case of an actuator in the chip module 30, the data processing circuit 14 can be connected between the input/output interface and the actuator 16 such that, for example, digital actuator data which an actuator input signal of the actuator 16 depends on can be generated by the data processing circuit 14 from digital data exemplarily received from the outside via the input/output interface 18. In addition, the chip module 30 includes a manipulation detector assembly 32 which is configured to output an alarm signal 34 responsive to attacks affecting the (digital) sensor and/or actuator data.

The alarm signal 34 may exemplarily be a notification signal which is communicated to the outside via the input/output interface 18 so that, for example, a controller chip connected to the chip module 30 is notified about a potential attack. According to further embodiments of the present invention, the alarm signal 34 may also trigger a protective mechanism on the sensor/actuator chip module 30 by, for example, deleting security-relevant data from the memory 12 or interrupting a supply voltage supply for the sensor/actuator chip module 30.

Figure 4:
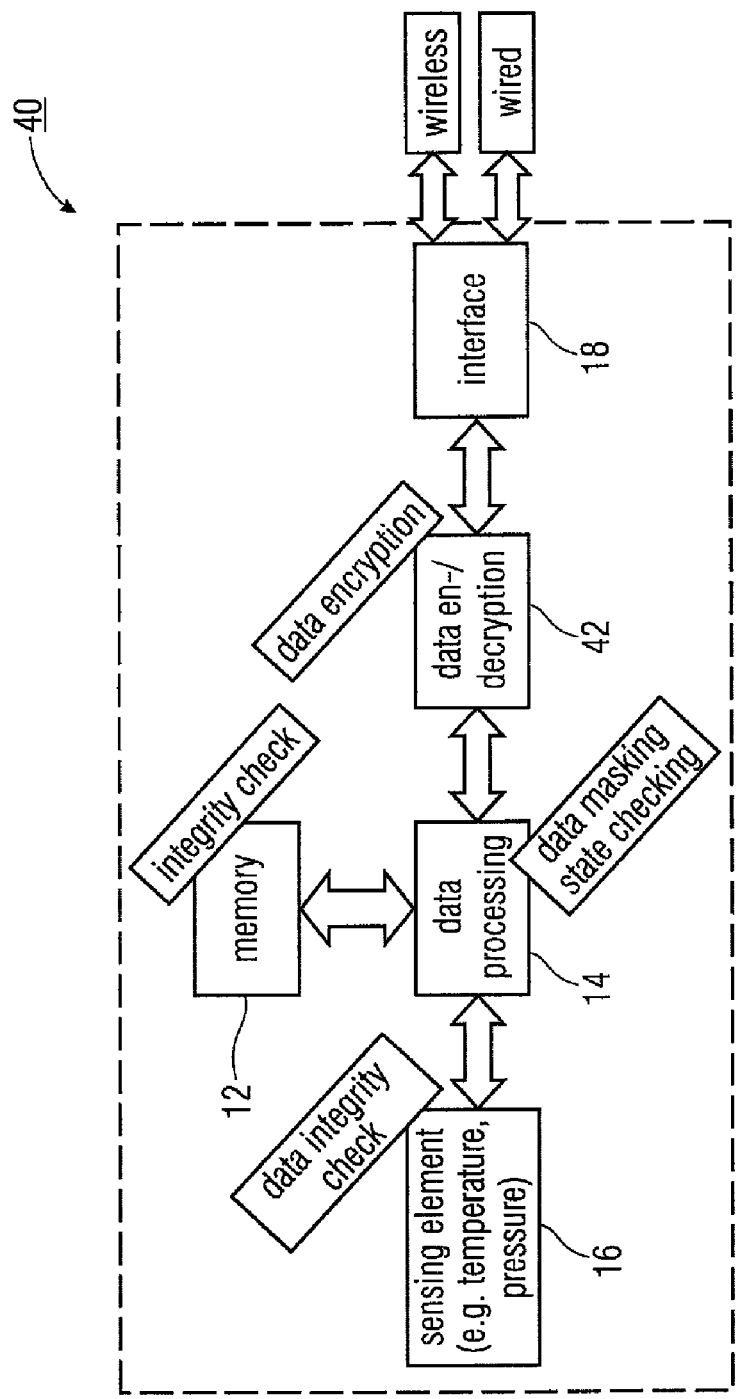
FIG. 4 shows a schematic block circuit diagram of a chip module according to an embodiment of the present invention.

The manipulation detector assembly 32 may be implemented to guarantee data integrity at a plurality of locations in the chip module 30 which may be spaced apart from one another, which is to be indicated by the broken lines in FIG. 3 and/or FIG. 4. Thus, a sensor and/or actuator chip module secure against attacks and attempts of manipulation can be provided by the present invention.

A schematic block circuit diagram of a chip module 40 according to an embodiment of the present invention is shown in FIG. 4.

The chip module 40 shown in FIG. 4 differs from the chip module 10 already described referring to FIG. 1 in that manipulations of the chip module 40 up to a certain extent can be recognized at several locations within the chip module 40. Exemplarily, a manipulation of the memory 12 can be recognized by an integrity check. In addition, manipulations of data transfers on the chip module 40 can be recognized. Also, manipulations of processes of state machines on the chip module 40 can be recognized and may even be prevented. Data sent from the sensor to the outside and/or from the outside to the actuator 16 can be protected against manipulations outside the chip module 40 by means of an additional cryptography module 42 connected between the data processing circuit 14 and the input/output interface 18.

The sensor/actuator 16 may, for example, be implemented as a micro-electromechanical or electromechanical sensor/actuator. Such a micro electromechanical system (MEMS) may comprise a combination of a mechanical element which serves as a sensor/actuator, and an electronic circuit including electrical interaction with mechanical deformation and/or motion of the mechanical element. The mechanical element and the electronic circuit may both be integrated on a substrate and/or chip.

The sensor 16, however, may also be a measuring quantity sensor or sensing element detecting certain physical or chemical characteristics, such as, for example, heat radiation, temperature, humidity, pressure, sound, brightness or acceleration and/or material qualities of its surroundings, in a qualitative or, as measuring quantity, quantitative manner. These quantities are detected by means of physical or chemical effects and converted into processable quantities, in particular electrical signals.

The actuator 16 may be an actuating mechanism translating an electrical signal to mechanical work, i.e. motion. Such actuators are, for example, light-emitting, piezoelectric, micro-fluidic devices, bimetal actuators, hydraulics or pneumatic actuators, electrochemical actuators, piezo-actuators, magnetostrictive actuators, rheological actuators, shape-memory alloys or chemical actuators.

The data processing circuit 14 may be implemented to convert analog sensor output signals having more than two quantizing levels to form digital sensor data. Also, in the case of an actuator chip module, the data processing circuit 14 processes digital actuator signals from the input/output interface 18 for the actuator comprising more than two quantizing levels to form, for example, an analog drive signal for the actuator 16.

The manipulation detector assembly 32 can be adjusted to be insensitive to attacks on analog signals, like for example an analog sensor output signal (such as, for example, current or voltage). This means that the manipulation detector assembly 32 monitors digital signals from the sensor and/or to the actuator 16.

Thus, attacks on sensor and/or actuator chip modules can be recognized and evaluated by embodiments of the present invention and data from/to the chip module can be rendered private by encryption and, above all, authenticatable.

Subsequently, different possible implementations of the manipulation detector assembly 32 will be described.

The manipulation detector assembly 32 may be implemented in various manners which depend on the attacks to be warded off. There are a number of ways of attacking to provoke errors.

Alterations in a supply voltage of the chip module, caused, for example, so-called spike attacks, can cause the data processing circuit 14 which is exemplarily implemented as a processor to misinterpret or even skip program instructions or commands.

Altering an external clock frequency $f_{clk}$ fed to the chip module may result in incorrect reading and/or writing of data (the data processing circuit 14 tries to read a value from a data bus before the memory 12 has had the opportunity to output the value requested). In addition, altering the external clock frequency $f_{clk}$ may result in skipping instructions or commands of the data processing circuit 14, so that the data processing circuit 14 will execute a command n+1 before the data processing circuit has finished executing the command n.

Another error cause may be a chip module temperature outside a temperature range specified by the manufacturer in which the chip module operates as intended.

Furthermore, due to photoelectrical effects, all the electrical circuits are light-sensitive. A current induced by photons in an electrical circuit can be used to provoke errors, should the electrical circuit be exposed to intense light for a short duration. A similar effect may, for example, be caused by irradiating a part of an electrical circuit by laser light. X-ray and ion radiation are examples of further error sources.

In order to recognize and ward off different attacks described before, counter measures can be taken by the manipulation detector assembly 32. Thus, the manipulation detector assembly 32 according to embodiments may be dedicated hardware for recognizing attacks. According to further embodiments of the present invention, the manipulation detector assembly 32 may also be programmable logic for implementing counter measures against attacks by software, i.e. computer programs.

Possible embodiments of the manipulation detector assembly 32 will be explained in greater detail below.

Figure 5A:
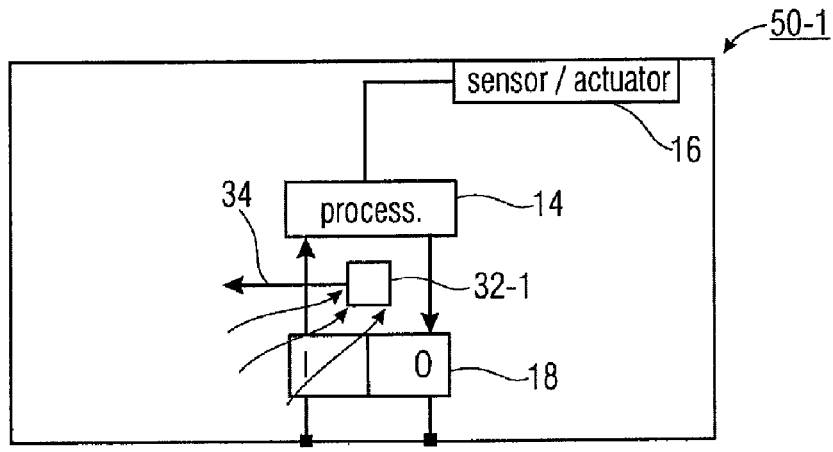
FIGS. 5a-d are schematic illustrations of chip modules comprising manipulation detector assemblies according to various embodiments of the present invention.

FIG. 5*a* shows a chip module 50-1 according to an embodiment of the present invention comprising a manipulation detector assembly 32-1 implemented as a light detector. The light detector 32-1 exemplarily detects a gradient of light incident on the chip module 50-1 in order to output the alarm signal 32 already described in the case of irregular irradiation of the sensor/actuator chip module 50-1.

Figure 5B:
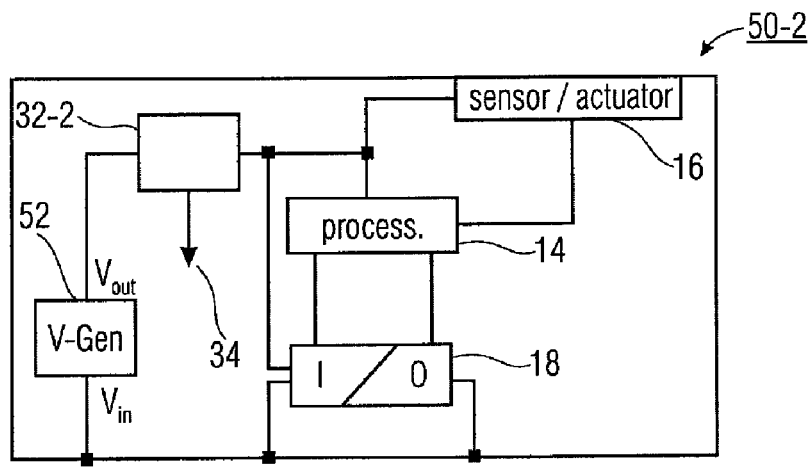

FIG. 5*b* shows another embodiment of a chip module 50-2 in which the manipulation detector assembly 32-2 is implemented as a supply voltage detector. In this embodiment, the supply voltage detector 32-2 is coupled to a supply voltage generator 52 for the chip module 50-2 in order to recognize sudden variations in the supply voltage. If the supply voltage falls outside a certain tolerance range or changes too abruptly, the supply voltage detector 32-2 will generate the alarm signal 34.

Figure 5C:
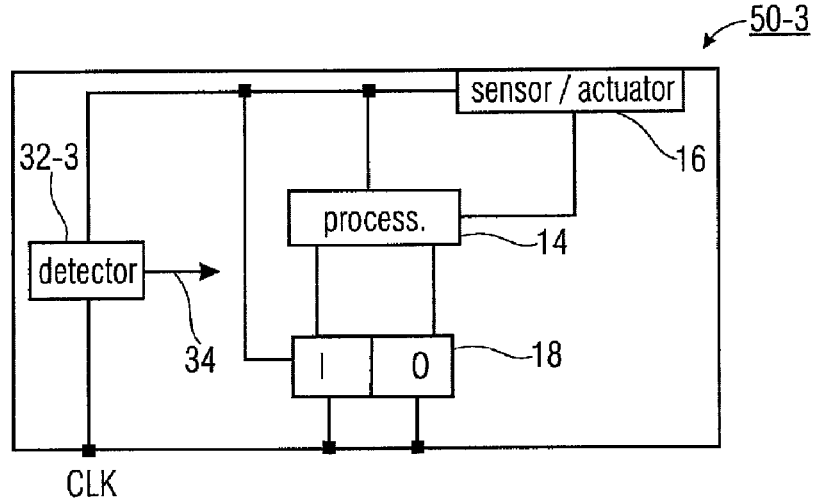

Another embodiment is schematically shown in FIG. 5*c*. In the chip module 50-3 shown in FIG. 5*c*, the manipulation detector assembly 32-3 monitors an external clock signal fed from outside and/or its frequency $f_{clk}$. If the clock frequency $f_{clk}$ applied falls outside an allowable tolerance range, the alarm signal 34 will be triggered.

Figure 5D:
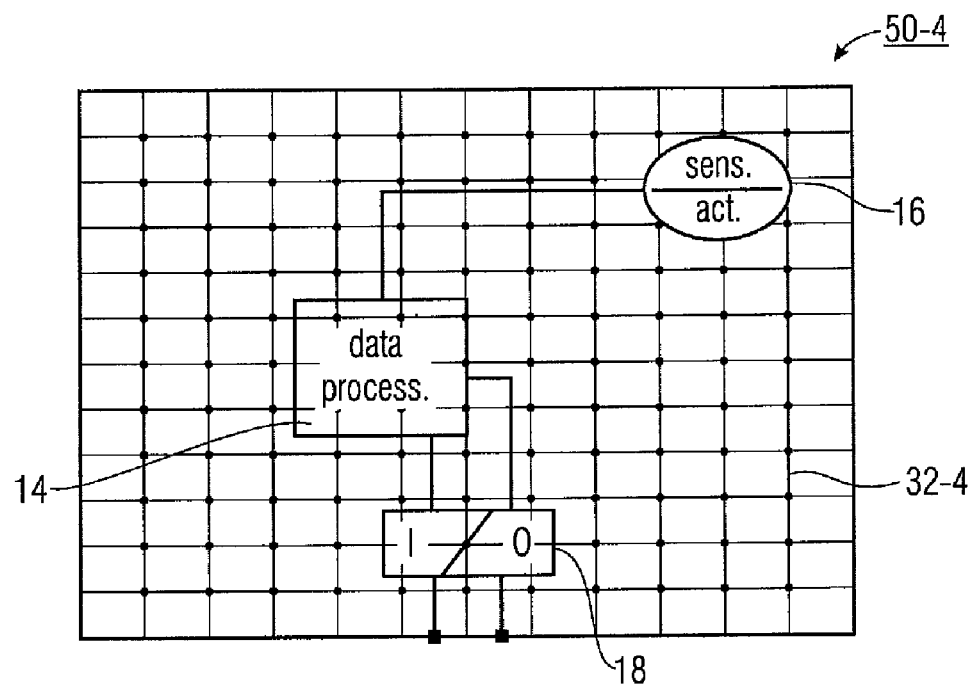

In the embodiment shown in FIG. 5*d*, the chip module 50-4 is surrounded by a conductive pattern 32-4. Thus, the conductive pattern 32-4 corresponds to an implementation of the manipulation detector assembly. The conductive pattern 32-4 is exemplarily integrated in an electrical circuit of the manipulation detector assembly, wherein destroying or altering the conductive pattern 32-4 causes a capacitive, resistive or inductive alteration in the electrical circuit resulting in the alarm signal 34 to be triggered when exceeding a threshold.

Figure 6A:
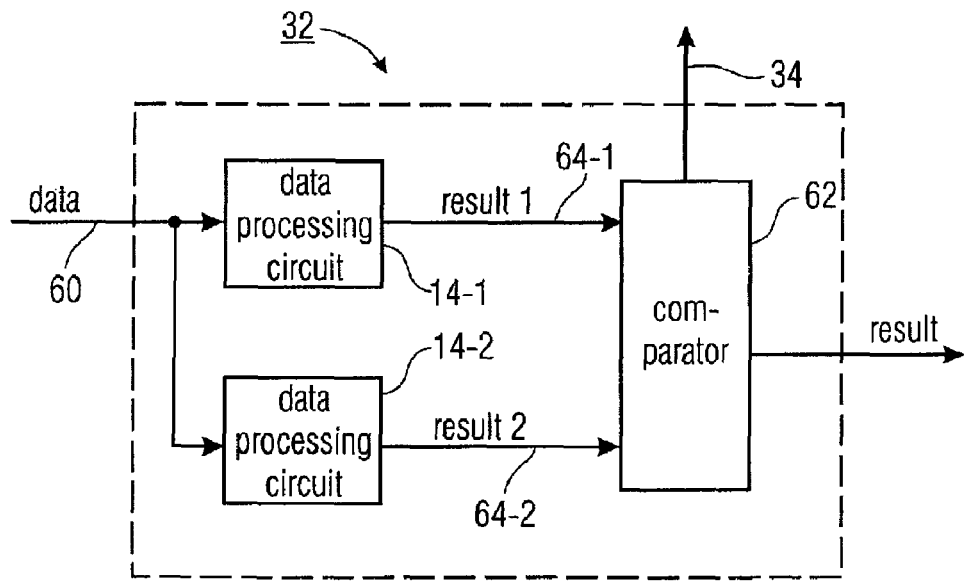
FIGS. 6a-c are basic illustrations of manipulation detector assemblies using redundancy according to various embodiments of the present invention.

Another way of detecting error-provoking attacks is employing hardware and/or software redundancy, as is schematically shown in FIG. 6*a*.

FIG. 6*a* shows a manipulation detector assembly 32 comprising an input for data 60, two identical data processing circuits 14-1 and 14-2 and a comparator 62.

The data 60 may be (digital) sensor data from a sensor and/or (digital) actuator data for an actuator. The data 60 are passed on to both identical data processing circuits 14-1, 14-2 to obtain, at their outputs, respective results 64-1 and 64-2 which in turn are passed on to the comparator 62. If the two results 64-1, 64-2 do not match, the comparator 62 will output the alarm signal 34 which may serve as trigger for further measures already described before.

Of course, more than two identical data processing circuits 14-n (n=1, 2, 3, . . . ) may be used to generate redundancy. Data inverse to the data 60 may also be fed to a second data processing block 14-2 according to embodiments, wherein the result 64-2 is inverted correspondingly after that.

Figure 6B:
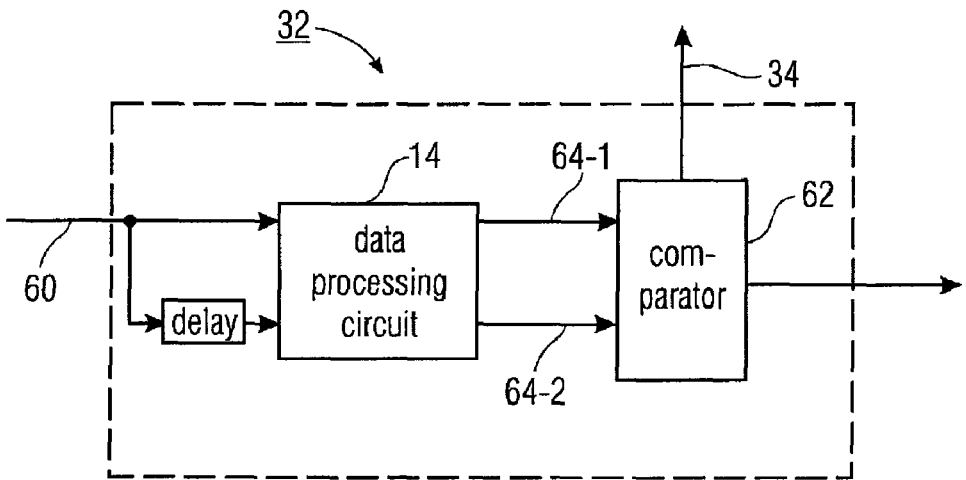

Another way of detecting manipulations and/or attacks using a manipulation detector assembly 32 according to an embodiment of the present invention is shown in FIG. 6*b*.

In the manipulation detector assembly 32 shown in FIG. 6*b*, the data 60 are fed to the data processing circuit 14 several times, i.e. offset in time. In the data processing circuit 14, every operation is executed several times in a time-offset way, which, in the case of two times, results in the two results 64-1 and 64-2 which in turn can be compared by the comparator 62. With insufficient matching of the results 64-1, 64-2, the alarm signal 34 will be output, as described before.

Figure 6C:
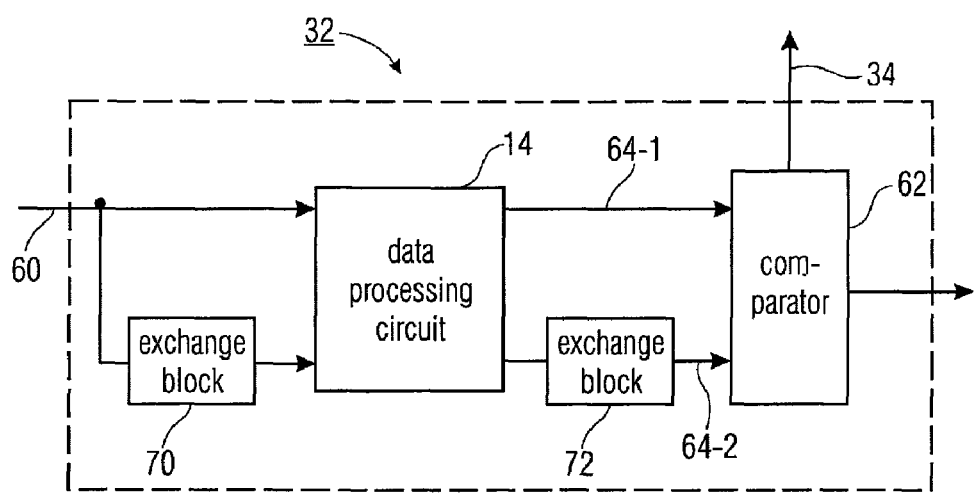

Other ways of detecting error-provoking attacks may be described using FIG. 6*c*.

In a first alternative, the least significant bits and most significant bits of a data word are exchanged in block 70, before the data 60 and the exchanged data are fed to the data processing circuit 14. The result 64-2 of the calculations using the exchanged bits is exchanged again correspondingly in block 72 and compared to the result 64-1 in the comparator 62 to detect a potential attack.

Blocks 70 and 72 can also realize opposite shift operations according to another embodiment. Thus, the bits of the data and/or data words 60 are shifted in one direction in block 70 and the corresponding result 64-2 of the data processing block 14 is shifted back in the opposite direction in block 72. Subsequently, the results 64-1 and 64-2 are compared again and a potential attack can be detected.

Of course, the attack detection measures described before may also be combined in a corresponding manipulation detector assembly in order to be able to maybe detect potential attacks even more reliably than by individual measures. It is to be pointed out here that the above list of attack detection measures is only exemplarily and not to be construed as final.

In addition or as an alternative to the measures for detecting manipulation described before which may be implemented in hardware, the manipulation detector assembly 32 may also be programmable logic which is programmed by software in order to detect and avoid error-provoking attacks. So-called check sums may exemplarily be implemented here in software. A further measure is randomly distributing command sequences in an algorithm. If the command sequence in an algorithm is selected to be arbitrary, it will be more difficult to predict what the programmable logic will do at a certain time. Of course, redundancy measures may also be performed in software, like, for example, repeating calculating operations or variables which are used by the calculating operations several times. Any dummy cycles may be used during code execution. Signal bus and memory encryption are further examples of measures.

A passive shield, like in the form of a metal layer, may be used to protect sensitive chip module parts. Thus, attacks using light or electromagnetic radiation can be made more difficult since the shield has to be removed before an attack.

In addition, unstable internal frequency generators can be used in a chip module as a protection against attacks which have to be synchronized with a certain result.

According to embodiments, sensor and/or actuator chip modules may be implemented both as single-chip modules (SCMs) and so-called multi-chip modules (MCMs). A top view of a multi-chip module 80 according to an embodiment is shown in FIG. 7*a*.

Figure 7A:
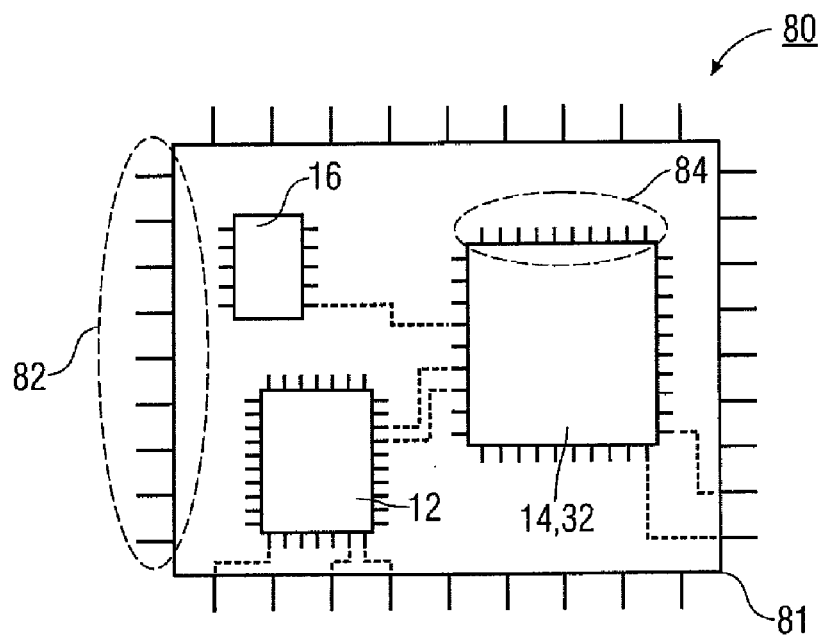
FIGS. 7a, b are schematic illustrations of multi-chip modules according to embodiments of the present invention.

In the multi-chip module 80 illustrated in FIG. 7a, the different microchips 16, 12, 14, 32 are accommodated in a common package 81 in a planar manner next to one another. The common package 81 has external terminals 82 by means of which the multi-chip module 80 can be contacted, for example on a board and/or a printed circuit board (PCB). In addition, the individual chips, such as, for example, a sensor/actuator chip 16, a memory chip 12 and a combined data processing and manipulation detector chip 14, 32, comprise terminals 84 interconnecting the individual chips 16, 12, 14, 32 and/or connecting same to the external terminals 82 of the multi-chip module 80.

Figure 7B:
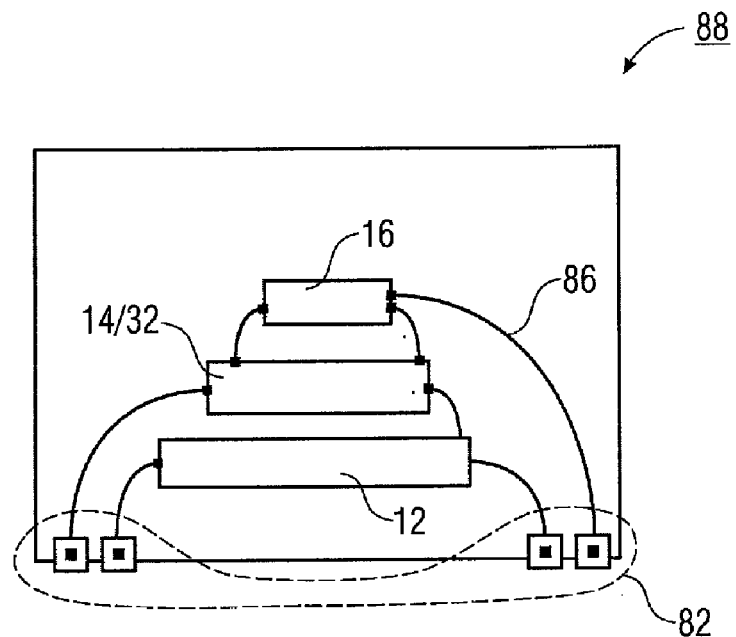

FIG. 7b shows a side view of a multi-chip module 90 according to another embodiment of the present invention in which the individual chips 16, 12, 14, 32 are not arranged horizontally next to one another, but vertically one above the other. Here, too, the chips are exemplarily connected to one another by bond wires 86 and/or to the external terminals 82. When the individual chip components are, as is shown in FIG. 7b, stacked vertically, we generally speak of a so-called system in package (SiP).

Figure 8:
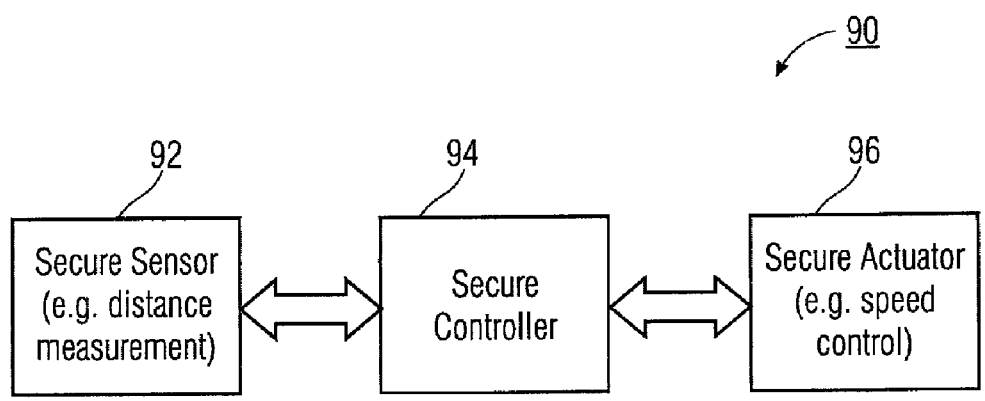
FIG. 8 is a schematic illustration of a secure sensor/actuator network including sensors/actuators chip modules according to embodiments of the present invention.

FIG. 8 schematically shows a sensor/actuator network 90 comprising a sensor chip module 92 according to an embodiment of the present invention, a secure control chip 94 and an actuator chip module 96 according to an embodiment of the present invention.

Each of the network elements 92, 94, 96 illustrated in FIG. 8 is, to a certain extent, secure against manipulations, such as, for example, manipulations of the memory, manipulations of data transfer on the respective chip module, manipulation of the processes on the respective chip module. The manipulation of data sent from the sensor and/or to the actuator can be made more difficult by encrypted connections between the individual network elements 92, 94, 96.

If, as is shown in FIG. 8, these individual components are interconnected to form a system, the entire control in its integrity and authenticity of the data can be rendered traceable. Furthermore, manipulations can not only be recognized on the component level, but also on the system level. The components can exchange data among one another via encrypted data channels. The sensor/actuator chip modules and the controller chip module implement mechanisms which have already been described before and increase the security of the respective devices. An example of an application may be controlling speed based on distance measurement. The distance measurement is exemplarily performed by the sensor chip module 92, the actuator chip module 96 adjusting the speed.

In summary, the present invention thus provides methods for protecting a chip module comprising a sensor and/or actuator and a data processing circuit connected between an input/output interface and a sensor and/or actuator such that sensor and/or actuator data may be communicated to/from the outside via the input/output interface, comprising a step of detecting an attack affecting the sensor and/or actuator data and a step of outputting an alarm signal responsive to an attack detected.

In particular, it is pointed out that, depending on the circumstances, the inventive scheme may also be implemented in software. The implementation may be on a digital storage medium, in particular on a disc or a CD having control signals which may be read out electronically, which can cooperate with a programmable computer system and/or micro controller such that the corresponding method for protecting a chip module will be executed. In general, the invention thus also is in a computer program product having program code stored on a machine-readable carrier for performing the inventive method when the computer program product runs on a computer and/or micro-controller. In other words, the invention may also be realized as a computer program having a program code for performing the method when the computer program runs on a computer and/or micro-controller.

The invention claimed is:

1. A chip module comprising:
   a sensor;
   an input/output interface;
   a data processing circuit connected between the input/output interface and the sensor so that sensor data, which are dependent on a sensor output signal of the sensor, may be communicated to outside the chip module via the input/output interface; and
   a manipulation detector assembly configured to output an alarm signal responsive to attacks on the chip module, affecting the sensor data.

2. The chip module according to claim 1, wherein the sensor is an electromechanical sensor.

3. The chip module according to claim 1, wherein the sensor is a radiation sensor, temperature sensor, humidity sensor, pressure sensor or optical sensor.

4. The chip module according to claim 1, wherein the data processing circuit is configured such that the sensor data represent the sensor output signal digitally with more than two quantizing levels.

5. The chip module according to claim 1, wherein the sensor is insensitive to attacks on the chip module, affecting the sensor output signal.

6. The chip module according to claim 1, wherein the manipulation detector assembly is adapted to be insensitive to attacks on the chip module, affecting the sensor output signal.

7. The chip module according to claim 1, wherein the manipulation detector assembly comprises a hardware block.

8. The chip module according to claim 1, wherein the manipulation detector assembly comprises programmable logic.

9. The chip module according to claim 1, wherein the manipulation detector assembly includes a sensor which is sensitive to physical manipulation of the chip module.

10. The chip module according to claim 1, wherein the manipulation detector assembly includes a sensor which is sensitive to manipulation of electrical states within the chip module.

11. The chip module according to claim 1, which is implemented as a multi-chip module (MCM).

12. The chip module according to claim 1, which is implemented as a single-chip module (SCM).

13. A chip module comprising:
   an actuator configured to perform actuator actions;
   an input/output interface;
   a data processing circuit connected between the input/output interface and the actuator so that actuator data, which the actuator actions of the actuator are dependent on, may be received from outside the chip module via the input/output interface; and
   a manipulation detector assembly configured to output an alarm signal responsive to attacks on the chip module, affecting the actuator actions.

14. The chip module according to claim 13, wherein the actuator is an electromechanical system, a light-emitting device, a piezoelectric device or a micro-fluidic device.

15. The chip module according to claim 13, wherein the data processing circuit is configured to process the actuator data digitally with more than two quantizing levels.

16. The chip module according to claim 13, wherein the manipulation detector assembly comprises a hardware block.

17. The chip module according to claim 13, wherein the manipulation detector assembly comprises programmable logic.

18. The chip module according to claim 13, which is implemented as a multi-chip module (MCM).

19. The chip module according to claim 13, which is implemented as a single-chip module (SCM).

20. A method for protecting a chip module comprising a sensor and a data processing circuit connected between an input/output interface and the sensor such that sensor data, which are dependent on a sensor output signal of the sensor, may be communicated to outside the chip module via the input/output interface, comprising:

detecting an attack on the chip module, affecting the sensor data; and outputting an alarm signal responsive to an attack detected.

21. The method according to claim 20, wherein the detection of the attack is based on redundant signal processing of the sensor data.

22. The method according to claim 20, wherein the detection of the attack is based on monitoring external influences supplied to the chip module.

23. A method for protecting a chip module comprising an actuator configured to perform actuator actions and a data processing circuit connected between an input/output interface and the actuator such that actuator data, which the actuator actions of the actuator are dependent on, may be received from outside the chip module via the input/output interface, comprising:

detecting an attack on the chip module, affecting the actuator actions; and outputting an alarm signal responsive to an attack detected.

24. The method according to claim 23, wherein the detecting is based on redundant signal processing of the actuator data.

25. A non-transitory computer-readable medium having stored thereon a computer program for performing, when the computer program runs on a computer and/or a micro-controller, a method for protecting a chip module comprising a sensor configured to output a sensor output signal, or an actuator configured to perform actuator actions, and a data processing circuit connected between an input/output interface on the one hand, and the sensor or the actuator on the other hand, such that sensor data which are dependent on the sensor output signal of the sensor, or actuator data, which the actuator actions of the actuator are dependent on, may be communicated to or received from outside the chip module via the input/output interface, comprising:

detecting an attack on the chip module, affecting the sensor data or actuator actions; and outputting an alarm signal responsive to an attack detected.

\* \* \* \* \*